No. 755,651. Patented March 29, 1904.

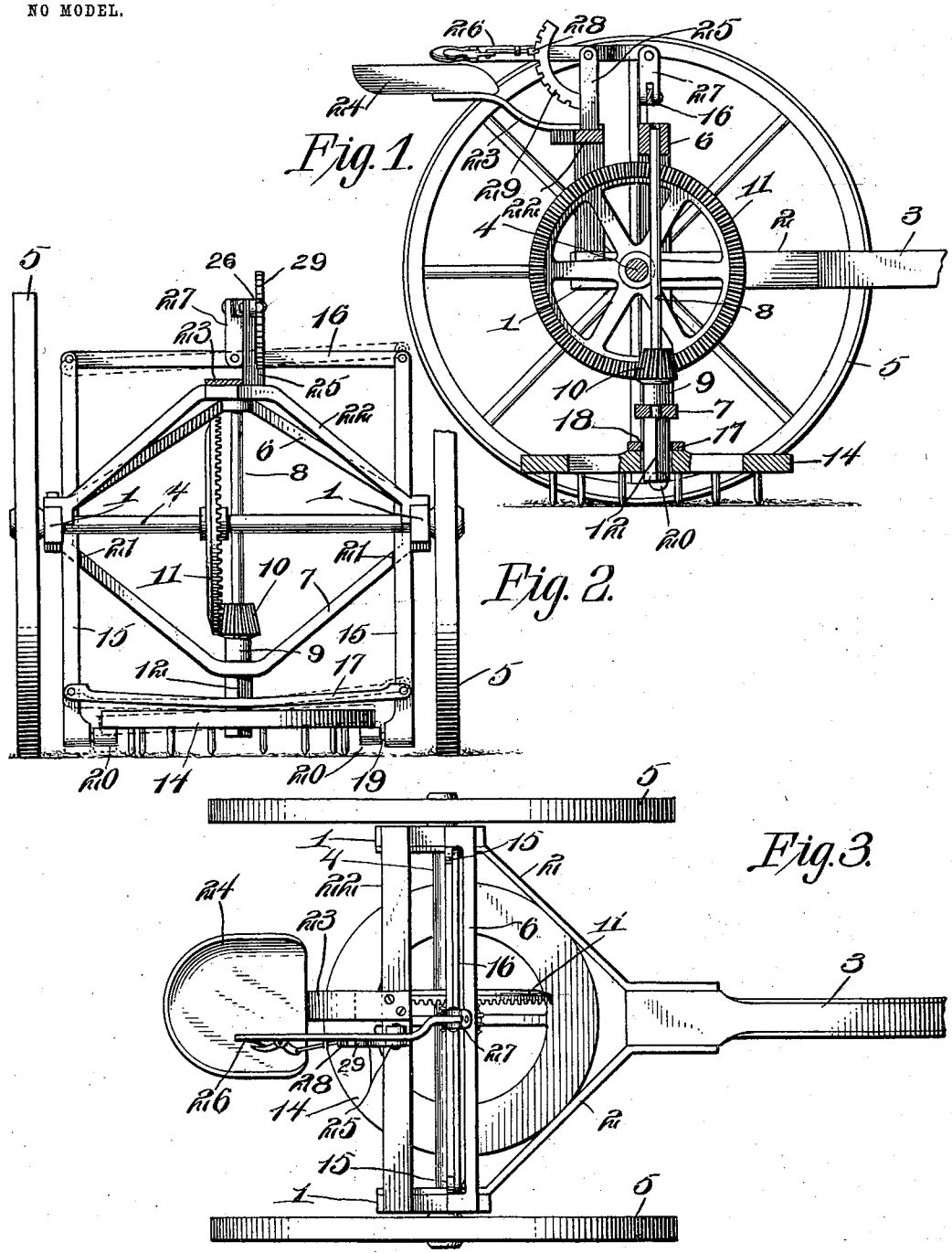

UNITED STATES PATENT OFFICE.

JOHN N. GRAVES, OF CUMBY, TEXAS

ROTARY HARROW.

SPECIFICATION forming part of Letters Patent No. 755,651, dated March 29, 1904.

Application filed December 26, 1903. Serial No. 186,746. (No model.)

*To all whom it may concern:*

Be it known that I, JOHN N. GRAVES, a citizen of the United States, residing at Cumby, in the county of Hopkins and State of Texas, have invented a new and useful Rotary Harrow, of which the following is a specification.

This invention relates to rotary harrows; and it has for its object to provide a device of this class mounted in a wheel-supported frame, provision being made for the vertical adjustment and for the tilting of the harrow member, as well as for the rotation of the latter.

The invention consists in the improved construction, arrangement, and combination of parts, which will be hereinafter fully described, and particularly pointed out in the claims.

In the accompanying drawings I have shown a simple and preferred form of embodiment of my invention, it being understood, however, that I do not necessarily limit myself to the precise structural details herein set forth, but reserve the right to such changes, alterations, and modifications, especially with regard to size, proportion, and general manner of assemblage, as may be resorted to within the scope of my invention and without departing from the spirit or sacrificing the utility of the same.

In said drawings, Figure 1 is a side elevation of a rotary harrow, constructed in accordance with the principles of my invention, the inner wheel being removed. Fig. 2 is a transverse sectional view. Fig. 3 is a plan view.

Corresponding parts in the several figures are indicated by similar numerals of reference.

The main frame of my improved rotary harrow comprises a pair of side bars 1 1, having forwardly-converging ends constituting hounds 2 2, between which the tongue 3 is mounted. The side bars 1 1 have bearings for the axle 4, carrying the supporting-wheels 5, one or both of which are to be securely mounted upon the axle to cause the latter to be rotated when the machine is in operation. The side members 1 1 of the frame support an upwardly-extending arch 6 and a downwardly-extending arch 7, which coöperate to form a vertical frame structure which is provided with bearings for a vertical shaft 8. The latter is provided above the lower arch 7 with an enlargement 9 to retain it within the limits of the frame structure. Said shaft is also provided with a pinion 10, meshing with the gear-wheel 11 upon the axle, from which rotary motion is thus transmitted to the shaft 8. The latter below the depending arch 7 is non-circular in cross-section, as shown at 12, and it carries upon this non-circular portion the rotary harrow member 14, which is vertically slidable upon the non-circular portion 12 of the shaft.

A vertically-slidable frame is provided, which is composed of side pieces 15 15, pivotally connected at their upper ends by a cross-bar 16 and likewise pivotally connected near their lower ends by a cross-bar 17, which latter is disposed above the rotary harrow member and is provided with an opening 18, surrounding the non-circular portion 12 of the shaft 8, which may freely rotate in said opening. The side members 15 in the vertically-slidable frame are provided at their lower ends with laterally-extending pins 19, carrying rollers 20, which extend underneath and serve to support the rotary harrow member. The side members 15 of the vertically-slidable frame are accommodated in recesses 21 in the rear sides of the arch members 6 and 7 and between said arch members and the axle and are thus prevented from displacement either longitudinally or transversely. The rear ends of the side members 1 of the frame support a yoke 22, upon which is mounted a seat-bar 23, carrying the driver's seat 24. Rising from the yoke 22 is an upright 25, at the upper end of which is fulcrumed a lever 26, which is connected by a link 27 with the top cross-bar 16 of the vertically-slidable frame. The lever 26 is provided with an ordinary spring-actuated lock-dog 28, adapted to engage a toothed segment 29 for the purpose of retaining the lever and the parts operated thereby in adjusted position.

The operation of this invention and its advantages will be readily understood from the foregoing description, taken in connection with the drawings hereto annexed. When the machine is propelled over the ground, the axle will revolve in its bearings, and through the intermediate gearing rotary motion is transmitted to the vertically-disposed shaft 8, carrying the horizontally-disposed rotary harrow member, which latter, it may be stated, consists simply of a suitably-constructed wheel or disk, provided with teeth extending downwardly, of any desired size, construction, and general arrangement. When the ground is rough and uneven, the joints at the corners of the vertically-slidable frame structure will cause the latter to automatically adapt itself to any tilting position which may be occupied by the rotary harrow member in conformity to the inequalities in the surface of the ground, it being necessarily understood that the connection between the harrow member and the non-circular portion 12 of the shaft 8 is sufficiently loose to permit the rotary harrow member to be tilted within such limits as are liable to occur. The rotary harrow member is supported upon the antifriction-rollers 20, carried by the side members of the vertically-adjustable frame, and is thus prevented from becoming disengaged from the non-circular portion of the shaft 8, said non-circular portion being extended downwardly a sufficient distance to cause the parts to remain properly connected under all circumstances. By manipulating the operating-lever 26 the vertically-slidable frame may be raised or lowered, thus raising or lowering the rotary harrow member, as will be readily understood. When the harrow member is lowered, it will be retained firmly in operative position by the stop-dog of the lever engaging the rack-segment. When, on the other hand, the rotary harrow member is raised from the ground for transportation, it is sustained in such raised position by the same means.

Having thus described my invention, I claim—

1. In a rotary harrow, a wheel-supported frame, a shaft journaled vertically in said frame, means for transmitting motion to said shaft from the rotary supporting means of the frame, a rotary harrow member slidable upon and connected with the shaft, and a vertically-movable frame supporting said rotary harrow member.

2. In a rotary harrow, a wheel-supported frame, a shaft journaled in said frame and deriving motion from the rotary supporting means, a rotary harrow member slidable upon and connected with said shaft, a vertically-slidable frame, and rotary supporting means connected with said frame and extending under and revolubly supporting the rotary harrow member.

3. In a rotary harrow, a wheel-supported frame, a vertical shaft journaled in said frame and deriving motion from the rotary supporting means, a rotary harrow member slidable upon and connected with said shaft, a vertically-slidable frame comprising side members and upper and lower cross-bars pivotally connected at the points of intersection, and rotary supporting means upon the lower ends of the side bars of said frame extending under and revolubly supporting the rotary harrow member.

4. In a rotary harrow, a wheel-supported frame, upwardly and downwardly extending arches connected with said frame, a vertically-slidable frame having side members disposed between the arch members and the axle, a vertical shaft journaled in the arch members and receiving motion from the rotary supporting means, a rotary harrow member slidable upon and connected with said shaft, and rotary supporting means for said rotary member connected with the side members of the vertically-slidable frame.

5. In a rotary harrow, a wheel-supported frame, a vertically-disposed shaft, means for transmitting motion to said shaft from the rotary supporting members of the frame, a rotary harrow member slidable upon and connected with said shaft, adjustable supporting means for said harrow member, and means for effecting adjustment of said supporting means and for retaining the latter, with the revoluble harrow member, in adjusted position.

6. In a rotary harrow, a wheel-supported frame, a shaft in said frame deriving motion from the rotary supporting members, a rotary harrow member upon said shaft, a vertically-slidable rectangular frame, loosely jointed at the corners thereof, rotary supporting means for the rotary harrow member journaled upon the side members of said slidable frame, an adjusting-lever, and a link connecting the latter with the top cross-bar of the vertically-adjustable jointed supporting-frame.

In testimony that I claim the foregoing as my own I have hereto affixed my signature in the presence of two witnesses.

JOHN N. GRAVES.

Witnesses:
MARVIN MORTON,
R. R. WILLIAMS.